US010042634B1

United States Patent
Myers et al.

(10) Patent No.: US 10,042,634 B1
(45) Date of Patent: Aug. 7, 2018

(54) STORAGE MANAGEMENT SYSTEM AND METHOD

(71) Applicant: EMC CORPORATION, Hopkinton, MA (US)

(72) Inventors: Jackson B. Myers, Cary, NC (US); Yingli Mao, Raleigh, NC (US); Kenneth Lee, Raleigh, NC (US); Ben Hulbert, Cary, NC (US); Eric Mitz, Parrish, FL (US); Eric Stouch, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 37 days.

(21) Appl. No.: 14/979,913

(22) Filed: Dec. 28, 2015

(51) Int. Cl.
*G06F 9/44* (2018.01)
*G06F 8/654* (2018.01)
*G06F 9/445* (2018.01)
*H04L 29/08* (2006.01)
*G06F 8/61* (2018.01)

(52) U.S. Cl.
CPC ............... *G06F 8/654* (2018.02); *G06F 8/61* (2013.01); *G06F 8/665* (2013.01); *H04L 67/34* (2013.01)

(58) Field of Classification Search
CPC . G06F 8/61; G06F 8/665; G06F 8/654; H04L 67/34

USPC ................................................. 717/168–178
See application file for complete search history.

(56) References Cited

U.S. PATENT DOCUMENTS

| 7,213,102 B2 * | 5/2007 | Buchanan, Jr. ..... G06F 11/1076 711/114 |
| 7,558,915 B2 * | 7/2009 | Cherian ................ G06F 3/0607 711/114 |

OTHER PUBLICATIONS

Cisco White Paper, "Achieve Automated, End-to-End Firmware Management with Cisco UCS Manager", 2010, Cisco Systems, 11 pages.*
Trevor Kay, "Server+ Certification Bible", 2001, Hungry Minds, Inc., Chapters 1-9, pp. 1-253.*
Dell White Paper, "Upgrading to Dell | EMC CX4 Series Storage Systems", 2009, Dell Inc., 16 pages.*

* cited by examiner

*Primary Examiner* — Ted T Vo
(74) *Attorney, Agent, or Firm* — Brian J. Colandreo; Heath M. Sargeant; Holland & Knight LLP

(57) ABSTRACT

A method, computer program product, and computing system for executing an upgrade procedure on a data storage system that includes a plurality of storage targets. One or more upgradable storage targets, chosen from the plurality of storage targets, are identified that are eligible for a firmware upgrade. A current firmware file is obtained for each of the upgradeable storage targets. The current firmware file is installed on each of the upgradable storage targets.

15 Claims, 3 Drawing Sheets

STORAGE MANAGEMENT SYSTEM AND METHOD

TECHNICAL FIELD

This disclosure relates to data storage systems and, more particularly, to systems and methods for upgrading data storage systems.

BACKGROUND

Storing and safeguarding electronic content is of paramount importance in modern business. Accordingly, large data storage systems may be utilized to protect such electronic content. As would be expected, such large data storage systems may be complex in nature and may include multiple components, all of which may need to be upgraded during their lifespan.

SUMMARY OF DISCLOSURE

In one implementation, a computer-implemented method is executed on a computing device and includes executing an upgrade procedure on a data storage system that includes a plurality of storage targets. One or more upgradable storage targets, chosen from the plurality of storage targets, are identified that are eligible for a firmware upgrade. A current firmware file is obtained for each of the upgradeable storage targets. The current firmware file is installed on each of the upgradable storage targets.

One or more of the following features may be included. Executing an upgrade procedure on the data storage system may include processing a catalog file that identifies a current firmware version for each of the plurality of storage targets. Identifying one or more upgradable storage targets may include comparing the current firmware version identified within the catalog file for each of the plurality of storage targets to an installed firmware version on each of the plurality of storage targets to identify the one or more upgradable storage targets. Obtaining the current firmware file for each of the upgradeable storage targets may include downloading the current firmware file for each of the upgradeable storage targets from a remote computing device. Obtaining the current firmware file for each of the upgradeable storage targets may include retrieving the current firmware file for each of the upgradeable storage targets from a storage device coupled to the data storage system. The plurality of storage targets may include one or more of: an electro-mechanical hard disk drive; and a solid-state/flash device. The upgrade procedure may include upgrading system software for the data storage system.

In another implementation, a computer program product resides on a computer readable medium and has a plurality of instructions stored on it. When executed by a processor, the instructions cause the processor to perform operations including executing an upgrade procedure on a data storage system that includes a plurality of storage targets. One or more upgradable storage targets, chosen from the plurality of storage targets, are identified that are eligible for a firmware upgrade. A current firmware file is obtained for each of the upgradeable storage targets. The current firmware file is installed on each of the upgradable storage targets.

One or more of the following features may be included. Executing an upgrade procedure on the data storage system may include processing a catalog file that identifies a current firmware version for each of the plurality of storage targets. Identifying one or more upgradable storage targets may include comparing the current firmware version identified within the catalog file for each of the plurality of storage targets to an installed firmware version on each of the plurality of storage targets to identify the one or more upgradable storage targets. Obtaining the current firmware file for each of the upgradeable storage targets may include downloading the current firmware file for each of the upgradeable storage targets from a remote computing device. Obtaining the current firmware file for each of the upgradeable storage targets may include retrieving the current firmware file for each of the upgradeable storage targets from a storage device coupled to the data storage system. The plurality of storage targets may include one or more of: an electro-mechanical hard disk drive; and a solid-state/flash device. The upgrade procedure may include upgrading system software for the data storage system.

In another implementation, a computing system including a processor and memory is configured to perform operations including executing an upgrade procedure on a data storage system that includes a plurality of storage targets. One or more upgradable storage targets, chosen from the plurality of storage targets, are identified that are eligible for a firmware upgrade. A current firmware file is obtained for each of the upgradeable storage targets. The current firmware file is installed on each of the upgradable storage targets.

One or more of the following features may be included. Executing an upgrade procedure on the data storage system may include processing a catalog file that identifies a current firmware version for each of the plurality of storage targets. Identifying one or more upgradable storage targets may include comparing the current firmware version identified within the catalog file for each of the plurality of storage targets to an installed firmware version on each of the plurality of storage targets to identify the one or more upgradable storage targets. Obtaining the current firmware file for each of the upgradeable storage targets may include downloading the current firmware file for each of the upgradeable storage targets from a remote computing device. Obtaining the current firmware file for each of the upgradeable storage targets may include retrieving the current firmware file for each of the upgradeable storage targets from a storage device coupled to the data storage system. The plurality of storage targets may include one or more of: an electro-mechanical hard disk drive; and a solid-state/flash device. The upgrade procedure may include upgrading system software for the data storage system.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
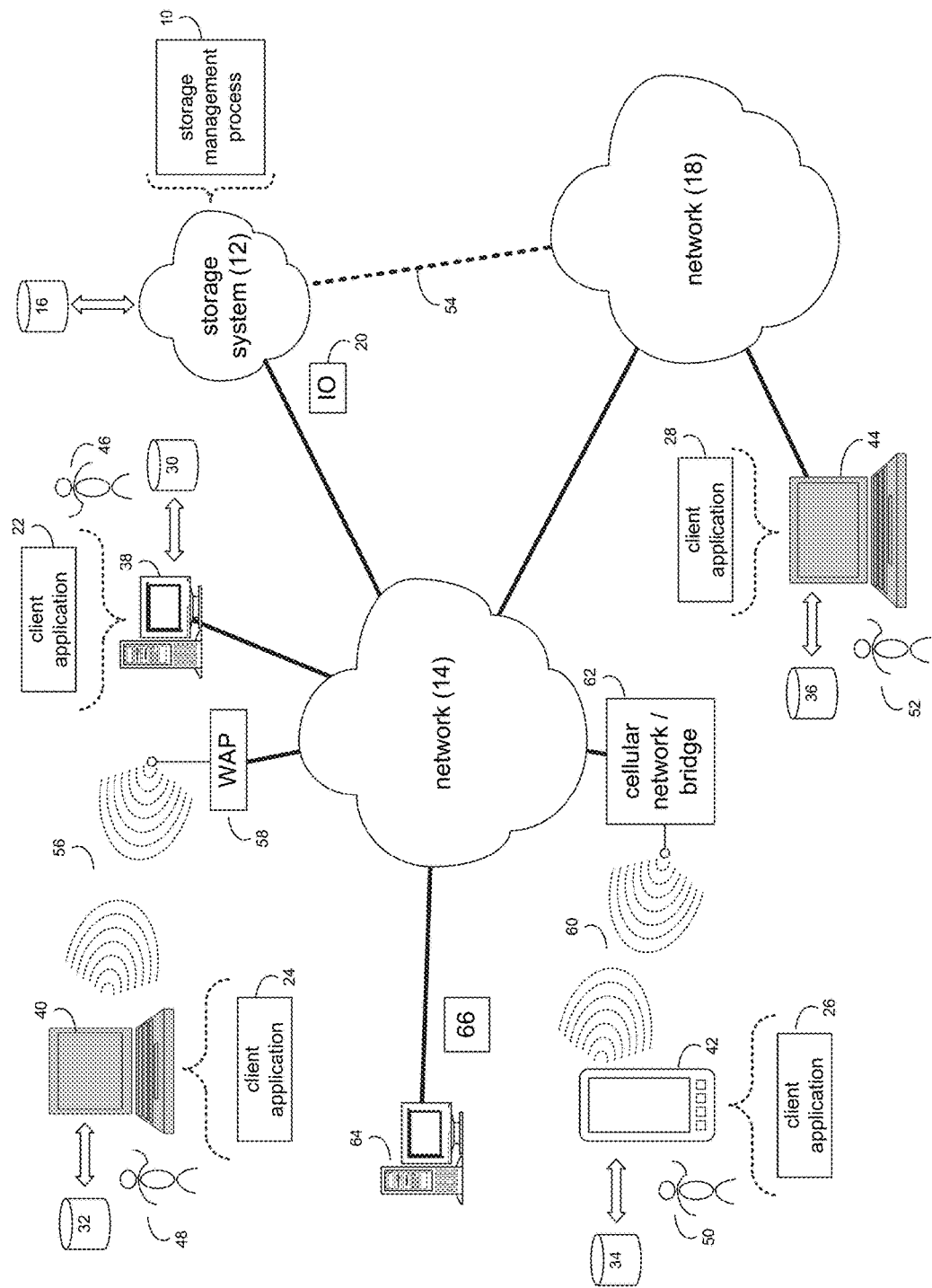
FIG. 1 is a diagrammatic view of a storage system and a storage management process coupled to a distributed computing network.

System Overview:

Referring to FIG. 1, there is shown storage management process 10 that may reside on and may be executed by data storage system 12, which may be connected to network 14 (e.g., the Internet or a local area network). Examples of data storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of data storage system 12 may execute one or more operating systems, examples of which may include but are not limited to: Microsoft Windows Server™; Redhat Linux™, Unix™, or a custom operating system, for example.

The instruction sets and subroutines of storage management process 10, which may be stored on storage device 16 included within data storage system 12, may be executed by one or more processors (not shown) and one or more memory architectures (not shown) included within data storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to data storage system 12. Examples of IO request 20 may include but are not limited to data write requests (i.e. a request that content be written to data storage system 12) and data read requests (i.e. a request that content be read from data storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access data storage system 12 directly through network 14 or through secondary network 18. Further, data storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

Figure 2:
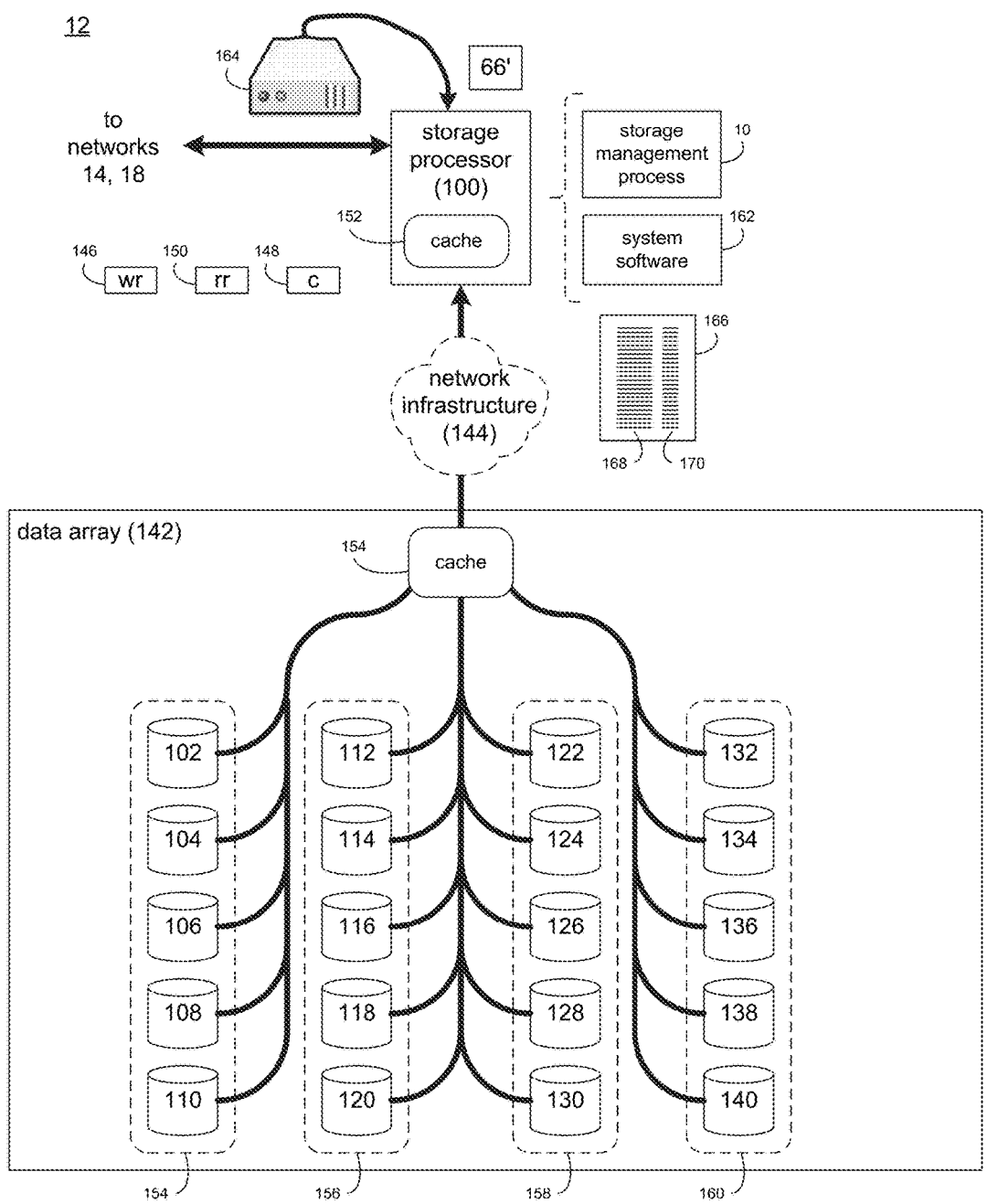
FIG. 2 is a diagrammatic view of the data storage system of FIG. 1.

Referring also to FIG. 2, data storage system 12 may include storage processor 100 and a plurality of storage targets (e.g. storage targets 102, 104, 106, 108, 110, 112, 114, 116, 118, 120, 122, 124, 126, 128, 130, 132, 134, 136, 138, 140).

Storage targets 102, 104, 106, 108, 110, 112, 114, 116, 118, 120, 122, 124, 126, 128, 130, 132, 134, 136, 138, 140 may be configured to provide various levels of performance and/or high availability. For example, one or more of storage targets 102, 104, 106, 108, 110, 112, 114, 116, 118, 120, 122, 124, 126, 128, 130, 132, 134, 136, 138, 140 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108, 110, 112, 114, 116, 118, 120, 122, 124, 126, 128, 130, 132, 134, 136, 138, 140 may be configured as a RAID 1 array, in which data is mirrored between storage targets. By mirroring data between storage targets, a level of high availability is achieved as multiple copies of the data are stored within data storage system 12.

While storage targets 102, 104, 106, 108, 110, 112, 114, 116, 118, 120, 122, 124, 126, 128, 130, 132, 134, 136, 138, 140 are discussed above as being configured in a RAID 0 or RAID 1 array, this is for illustrative purposes only and is not intended to be a limitation of this disclosure, as other configurations are possible. For example, some of storage targets 102, 104, 106, 108, 110, 112, 114, 116, 118, 120, 122, 124, 126, 128, 130, 132, 134, 136, 138, 140 may be configured as a RAID 3, RAID 4, RAID 5 or RAID 6 array.

While in this particular example, data storage system 12 is shown to include twenty storage targets (e.g. storage targets 102, 104, 106, 108, 110, 112, 114, 116, 118, 120, 122, 124, 126, 128, 130, 132, 134, 136, 138, 140), this is for illustrative purposes only and is not intended to be a limitation of this disclosure. Specifically, the actual number of storage targets may be increased or decreased depending upon e.g. the level of redundancy/performance/capacity required.

One or more of storage targets 102, 104, 106, 108, 110, 112, 114, 116, 118, 120, 122, 124, 126, 128, 130, 132, 134, 136, 138, 140 may be configured to store coded data, such as parity data. As is known in the art, coded data may be used to regenerate data that is lost/corrupted on one or more of the storage targets, wherein such coded data may be distributed across a plurality of storage targets 102, 104, 106, 108, 110, 112, 114, 116, 118, 120, 122, 124, 126, 128, 130, 132, 134, 136, 138, 140.

Examples of storage targets 102, 104, 106, 108, 110, 112, 114, 116, 118, 120, 122, 124, 126, 128, 130, 132, 134, 136, 138, 140 may include one or more electro-mechanical hard disk drives and/or solid-state/flash devices, wherein the combination of storage targets 102, 104, 106, 108, 110, 112, 114, 116, 118, 120, 122, 124, 126, 128, 130, 132, 134, 136, 138, 140 and processing/control systems (not shown) may form data array 142.

The manner in which data storage system 12 is implemented may vary depending upon e.g. the level of redundancy/performance/capacity required. For example, data storage system 12 may be a RAID device in which storage processor 100 is a RAID controller card and storage targets 102, 104, 106, 108, 110, 112, 114, 116, 118, 120, 122, 124, 126, 128, 130, 132, 134, 136, 138, 140 are individual "hot-swappable" hard disk drives. Another example of such a RAID device may include but is not limited to an NAS device. Alternatively, data storage system 12 may be configured as a SAN, in which storage processor 100 may be e.g., a server computer and each of storage targets 102, 104, 106, 108, 110, 112, 114, 116, 118, 120, 122, 124, 126, 128, 130, 132, 134, 136, 138, 140 may be a RAID device and/or a disk drive. Further still, one or more of storage targets 102, 104, 106, 108, 110, 112, 114, 116, 118, 120, 122, 124, 126, 128, 130, 132, 134, 136, 138, 140 may be a SAN.

In the event that data storage system 12 is configured as a SAN, the various components of data storage system 12 (e.g. storage processor 100, and storage targets 102, 104, 106, 108, 110, 112, 114, 116, 118, 120, 122, 124, 126, 128, 130, 132, 134, 136, 138, 140) may be coupled using network infrastructure 144, examples of which may include but are not limited to an Ethernet (e.g., Layer 2 or Layer 3) network, a fiber channel network, an InfiniBand network, or any other circuit switched/packet switched network.

Data storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to data storage system 12. Additionally/alternatively and when storage processor 100 is configured as an application server, these IO requests may be internally generated within storage processor 100. Examples of IO request 20 may include but are not limited to data write request 146 (i.e. a request that content 148 be written to data storage system 12) and data read request 150 (i.e. a request that content 148 be read from data storage system 12).

During operation of storage processor 100, content 148 to be written to data storage system 12 may be processed by storage processor 100. Additionally/alternatively and when storage processor 100 is configured as an application server, content 148 to be written to data storage system 12 may be internally generated by storage processor 100.

As discussed above, the instruction sets and subroutines of storage management process 10, which may be stored on storage device 16 included within data storage system 12, may be executed by one or more processors (not shown) and one or more memory architectures (not shown) included within data storage system 12. Accordingly, in addition to being executed on storage processor 100, some or all of the instruction sets and subroutines of storage management process 10 may be executed by one or more processors (not shown) and one or more memory architectures (not shown) included within data array 142.

Storage processor 100 may include frontend cache memory system 152. Examples of frontend cache memory system 152 may include but are not limited to a volatile, solid-state, cache memory system (e.g., a dynamic RAM cache memory system) and/or a non-volatile, solid-state, cache memory system (e.g., a flash-based, cache memory system).

During operation of storage processor 100, content 148 to be written to data storage system 12 may be received by storage processor 100. Additionally/alternatively and when storage processor 100 is configured as an application server, content 148 to be written to data storage system 12 may be internally generated by storage processor 100.

Storage processor 100 may initially store content 148 within frontend cache memory system 152. Depending upon the manner in which frontend cache memory system 152 is configured, storage processor 100 may immediately write content 148 to data array 142 (if frontend cache memory system 152 is configured as a write-through cache) or may subsequently write content 148 to data array 142 (if frontend cache memory system 152 is configured as a write-back cache).

Data array 142 may include backend cache memory system 154. Examples of backend cache memory system 154 may include but are not limited to a volatile, solid-state, cache memory system (e.g., a dynamic RAM cache memory system) and/or a non-volatile, solid-state, cache memory system (e.g., a flash-based, cache memory system). During operation of data array 142, content 148 to be written to data array 142 may be received from storage processor 100. Data array 142 may initially store content 148 within backend cache memory system 154 prior to being stored on e.g. one or more of storage targets 102, 104, 106, 108, 110, 112, 114, 116, 118, 120, 122, 124, 126, 128, 130, 132, 134, 136, 138, 140.

As discussed above, one or more of storage targets 102, 104, 106, 108, 110, 112, 114, 116, 118, 120, 122, 124, 126, 128, 130, 132, 134, 136, 138, 140 may be configured to form a RAID group array. Assume for the following example that storage targets one or more of storage targets 102, 104, 106, 108, 110, 112, 114, 116, 118, 120, 122, 124, 126, 128, 130, 132, 134, 136, 138, 140 are configured to form four RAID 5 arrays, namely RAID group 154 (which includes storage targets 102, 104, 106, 108, 110); RAID group 156 (which includes storage targets 112, 114, 116, 118, 120); RAID group 158 (which includes storage targets 122, 124, 126, 128, 130); and RAID group 160 (which includes storage targets 132, 134, 136, 138, 140).

Figure 3:
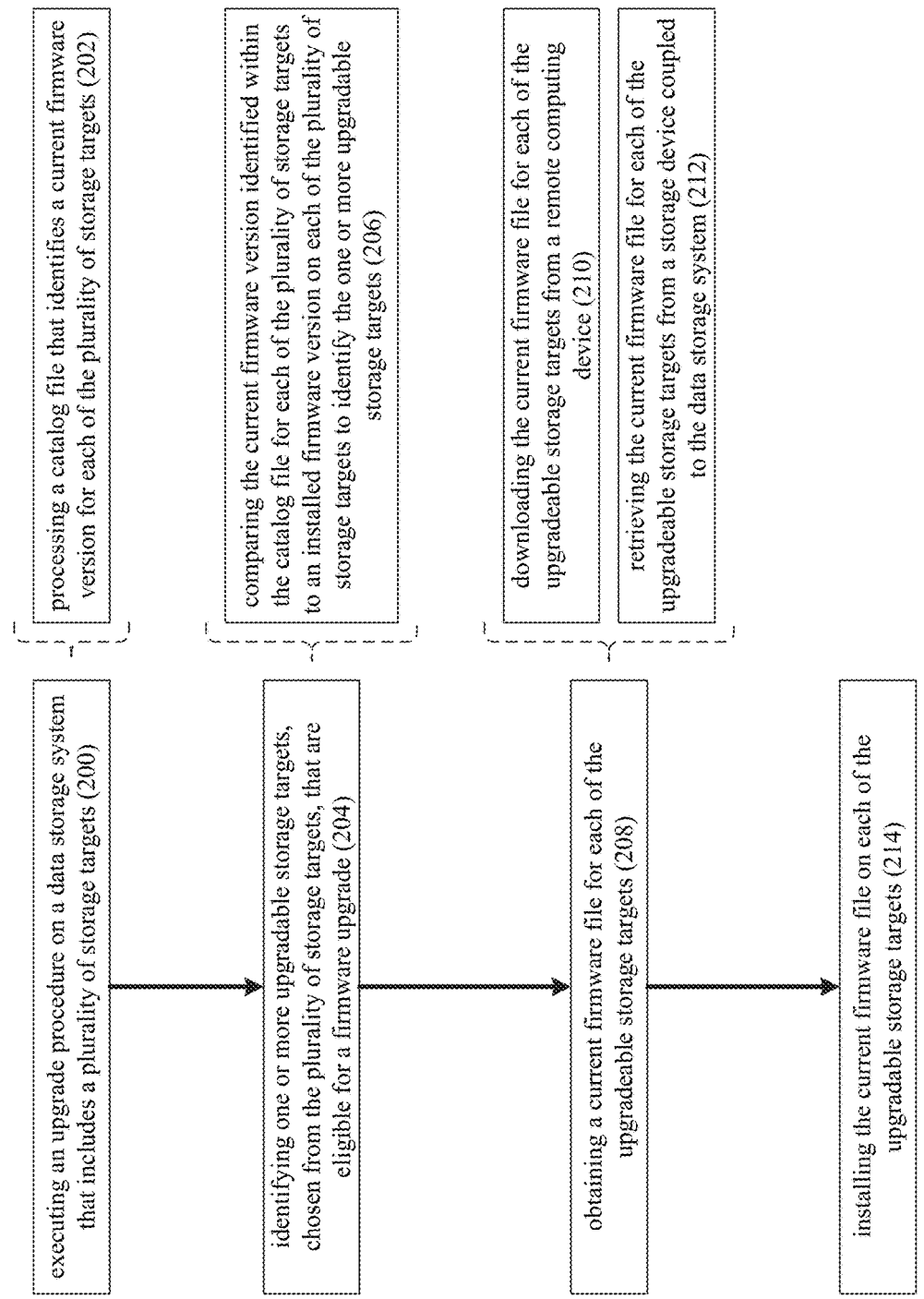
FIG. 3 is a flow chart of the storage management process of FIG. 1.

The Storage Management Process:

As will be discussed below in greater detail, storage management process 10 may be configured to implement procedures/rules that allow for the upgrade and maintenance of data storage system 12. Referring also to FIG. 3, assume for illustrative purposes that data storage system 12 is in need of an upgrade, wherein one or more of the applications executed on data storage system 12 are out-of-date. For this explanation, assume that storage management process 10 executes 200 an upgrade procedure on data storage system 12. As discussed above, data storage system 12 includes a plurality of storage targets (namely storage targets 102, 104, 106, 108, 110, 112, 114, 116, 118, 120, 122, 124, 126, 128, 130, 132, 134, 136, 138, 140) that are configured to form four RAID 5 arrays, namely: RAID group 154; RAID group 156; RAID group 158; and RAID group 160. For this example, assume that the above-referenced upgrade procedure includes upgrading system software 162 executed/resident on data storage system 12.

If data storage system 12 is coupled to an external network (e.g., network 14), as shown in FIG. 1, executing 200 the upgrade procedure may be accomplished by having data storage system 12 contact a remote server (e.g., remote server 64) that is operated and/or maintained by the company that is servicing and/or manufactured data storage system 12. However, in the interest of enhanced data security, data storage system 12 may not be coupled to any external networks in some configurations. Accordingly and with such a system, executing 200 the upgrade procedure on data storage system 12 may involve temporarily coupling data storage system 12 to an external storage device (e.g., external storage device 164).

When executing 200 the above-described upgrade procedure on data storage system 12, storage management process 10 may process 202 catalog file 166 that may identify a current firmware version for each of the plurality of storage targets (namely storage targets 102, 104, 106, 108, 110, 112, 114, 116, 118, 120, 122, 124, 126, 128, 130, 132, 134, 136, 138, 140) included within data storage system 12. Specifically, assume that when data storage system 12 was manufactured, the plurality of storage targets (namely storage targets 102, 104, 106, 108, 110, 112, 114, 116, 118, 120, 122, 124, 126, 128, 130, 132, 134, 136, 138, 140) were chosen by the manufacturer from a group of fifty compatible storage devices that may be installed within data storage system 12, wherein these fifty compatible storage devices may have been offered by e.g., different manufactures in different capacities and performance levels.

Accordingly and in one implementation, catalog file 166 may include a series of entries that define a unique identifier (e.g., unique identifiers 168) for each of (in this example) the fifty compatible storage devices and a current firmware version (e.g., firmware versions 170) for each of (in this example) the fifty compatible storage devices. An example of a typical entry within catalog file 166 may include (for the unique identifier) WD76015 and may include (for the current firmware version) v1.0.34.

Additionally, other information/entries may be included within catalog file 166, examples of which may include but are not limited to: a manufacturer of the drive firmware (e.g., Seagate™, Samsung™, Western Digital™), a date associated with the firmware release, and a minimum firmware revision (e.g., for when you need to upgrade a drive multiple times to get to the latest firmware version).

Storage management process 10 may identify 204 one or more upgradable storage targets, chosen from the plurality of storage targets (e.g., storage targets 102, 104, 106, 108, 110, 112, 114, 116, 118, 120, 122, 124, 126, 128, 130, 132, 134, 136, 138, 140), that are eligible for a firmware upgrade. When identifying 204 one or more upgradable storage targets, storage management process 10 may compare 206 the current firmware version (e.g., firmware versions 170) identified within catalog file 166 for each of the plurality of storage targets (e.g., storage targets 102, 104, 106, 108, 110, 112, 114, 116, 118, 120, 122, 124, 126, 128, 130, 132, 134, 136, 138, 140) to an installed firmware version on each of the plurality of storage targets (e.g., storage targets 102, 104, 106, 108, 110, 112, 114, 116, 118, 120, 122, 124, 126, 128, 130, 132, 134, 136, 138, 140) to identify 204 the one or more upgradable storage targets.

Continuing with the above-stated example in which data storage system 12 includes storage targets 102, 104, 106, 108, 110, 112, 114, 116, 118, 120, 122, 124, 126, 128, 130, 132, 134, 136, 138, 140, storage management process 10 may poll/query each of storage targets 102, 104, 106, 108, 110, 112, 114, 116, 118, 120, 122, 124, 126, 128, 130, 132, 134, 136, 138, 140 to determine e.g., the make, model and installed firmware version of each of these storage targets. Storage management process 10 may then process catalog file 166 to determine the current firmware version available for each of these storage targets and may then compare 206 the current firmware version of each of these storage targets to the installed firmware version on each of these storage targets to identify 204 one or more upgradable storage targets within storage targets 102, 104, 106, 108, 110, 112, 114, 116, 118, 120, 122, 124, 126, 128, 130, 132, 134, 136, 138, 140.

Assume for illustrative purposes that storage targets 102, 106, 108, 114, 116, 124, 134, 136 are identified 204 by storage management process 10 as being upgradable storage targets (i.e., storage targets with out-of-date firmware). Once the group of upgradable storage targets (namely storage targets 102, 106, 108, 114, 116, 124, 134, 136) is identified 204, storage management process 10 may obtain 208 a current firmware file for each of the upgradeable storage targets.

When obtaining 208 the current firmware file for each of the upgradeable storage targets (namely storage targets 102, 106, 108, 114, 116, 124, 134, 136), Storage management process 10 may download 210 the current firmware file (e.g., current firmware file 66) for each of upgradeable storage targets (namely storage targets 102, 106, 108, 114, 116, 124, 134, 136) from a remote computing device (e.g., remote server 64).

However and as discussed above, in the interest of enhanced data security, data storage system 12 may not be coupled to any external networks. Accordingly and with such a system, when obtaining 208 the current firmware file for each of the upgradeable storage targets (namely storage targets 102, 106, 108, 114, 116, 124, 134, 136), storage management process 10 may retrieve 212 the current firmware file (e.g., current firmware file 66') for each of the upgradeable storage targets (namely storage targets 102, 106, 108, 114, 116, 124, 134, 136) from a storage device (e.g., external storage device 164) coupled to data storage system 12.

As discussed above and in this example, when data storage system 12 was manufactured, the plurality of storage targets (namely storage targets 102, 104, 106, 108, 110, 112, 114, 116, 118, 120, 122, 124, 126, 128, 130, 132, 134, 136, 138, 140) were chosen by the manufacturer from a group of fifty compatible storage devices that may be installed within data storage system 12. Accordingly, external storage device 164 may be configured to include the latest firmware file each of these fifty storage devices so that the firmware files may be retrieved by storage management process 10 from external storage device 164.

Alternatively and if preloading dozens (if not hundreds) of firmware files on external storage device 164 is not desirable, external storage device 164 may initially not include any firmware files. However, once storage management process 10 identifies 204 storage targets 102, 106, 108, 114, 116, 124, 134, 136 as being upgradable storage targets (i.e., storage targets with out-of-date firmware), this list of upgradable storage targets may be saved upon external storage device 164. External storage device 164 may then be uncoupled from data storage system 12 and coupled to a computing device (not shown) that is capable of accessing remote server 64 so that current firmware file 66 may be obtained for upgradable storage targets 102, 106, 108, 114, 116, 124, 134, 136 and stored on external storage device 164. Once complete, external storage device 164 may be recoupled to data storage system 12 so that these current firmware files may be processed by storage management process 10.

Once the current firmware files are obtained 208, storage management process 10 may install 214 these current firmware files on each of upgradable storage targets 102, 106, 108, 114, 116, 124, 134, 136. When installing 214 these current firmware files on each of upgradable storage targets 102, 106, 108, 114, 116, 124, 134, 136, storage management process 10 install 214 them in a manner that maintains a high level of data availability.

As discussed above, data storage system 12 includes a plurality of storage targets (namely storage targets 102, 104, 106, 108, 110, 112, 114, 116, 118, 120, 122, 124, 126, 128, 130, 132, 134, 136, 138, 140) that are configured to form four RAID 5 arrays, namely: RAID group 154; RAID group 156; RAID group 158; and RAID group 160. Accordingly and when install 214 these firmware files on each of upgradable storage targets 102, 106, 108, 114, 116, 124, 134, 136, storage management process 10 may be configured to only upgrade the firmware on one storage target within a RAID group at a time.

Accordingly, storage management process 10 may e.g., install 214 the current firmware files on upgradable storage targets 102, 114, 124, 134; and may then install 214 the current firmware files on upgradable storage targets 106, 116, 136; and may then install 214 the current firmware files on upgradable storage targets 108.

GENERAL

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    executing an upgrade procedure on a data storage system that includes a plurality of storage targets, wherein executing the upgrade procedure includes processing a catalog file that identifies a current firmware version for each of the plurality of storage targets;
    identifying one or more upgradable storage targets, chosen from the plurality of storage targets, that are eligible for a firmware upgrade, wherein identifying the one or more upgradable storage targets includes comparing the current firmware version identified within the catalog file for each of the plurality of storage targets to an installed firmware version on each of the plurality of storage targets to identify the one or more upgradable storage targets;
    obtaining a current firmware file for each of the upgradeable storage targets in response to identifying the one or more upgradable storage targets; and
    installing the current firmware file on each of the upgradable storage targets.

2. The computer-implemented method of claim 1 wherein obtaining the current firmware file for each of the upgradeable storage targets includes:
    downloading the current firmware file for each of the upgradeable storage targets from a remote computing device.

3. The computer-implemented method of claim 1 wherein obtaining the current firmware file for each of the upgradeable storage targets includes:
    retrieving the current firmware file for each of the upgradeable storage targets from a storage device coupled to the data storage system.

4. The computer-implemented method of claim 1 wherein the plurality of storage targets includes one or more of:
    an electro-mechanical hard disk drive; and
    a solid-state/flash device.

5. The computer-implemented method of claim 1 wherein the upgrade procedure includes upgrading system software for the data storage system.

6. A computer program product residing on a non-transitory computer readable medium having a plurality of instructions stored thereon which, when executed by a processor, cause the processor to perform operations comprising:
    executing an upgrade procedure on a data storage system that includes a plurality of storage targets, wherein executing the upgrade procedure includes processing a catalog file that identifies a current firmware version for each of the plurality of storage targets;
    identifying one or more upgradable storage targets, chosen from the plurality of storage targets, that are eligible for a firmware upgrade, wherein identifying the one or more upgradable storage targets includes comparing the current firmware version identified within the catalog file for each of the plurality of storage targets to an installed firmware version on each of the plurality of storage targets to identify the one or more upgradable storage targets;
    obtaining a current firmware file for each of the upgradeable storage targets in response to identifying the one or more upgradable storage targets; and
    installing the current firmware file on each of the upgradable storage targets.

7. The computer program product of claim 6 wherein obtaining the current firmware file for each of the upgradeable storage targets includes:
    downloading the current firmware file for each of the upgradeable storage targets from a remote computing device.

8. The computer program product of claim 6 wherein obtaining the current firmware file for each of the upgradeable storage targets includes:
    retrieving the current firmware file for each of the upgradeable storage targets from a storage device coupled to the data storage system.

9. The computer program product of claim 6 wherein the plurality of storage targets includes one or more of:
    an electro-mechanical hard disk drive; and
    a solid-state/flash device.

10. The computer program product of claim 6 wherein the upgrade procedure includes upgrading system software for the data storage system.

11. A computing system including a processor and memory configured to perform operations comprising:
  executing an upgrade procedure on a data storage system that includes a plurality of storage targets, wherein executing the upgrade procedure includes processing a catalog file that identifies a current firmware version for each of the plurality of storage targets;
  identifying one or more upgradable storage targets, chosen from the plurality of storage targets, that are eligible for a firmware upgrade, wherein identifying the one or more upgradable storage targets includes comparing the current firmware version identified within the catalog file for each of the plurality of storage targets to an installed firmware version on each of the plurality of storage targets to identify the one or more upgradable storage targets;
  obtaining a current firmware file for each of the upgradeable storage targets in response to identifying the one or more upgradable storage targets; and
  installing the current firmware file on each of the upgradable storage targets.

12. The computing system of claim 11 wherein obtaining the current firmware file for each of the upgradeable storage targets includes:
  downloading the current firmware file for each of the upgradeable storage targets from a remote computing device.

13. The computing system of claim 11 wherein obtaining the current firmware file for each of the upgradeable storage targets includes:
  retrieving the current firmware file for each of the upgradeable storage targets from a storage device coupled to the data storage system.

14. The computing system of claim 11 wherein the plurality of storage targets includes one or more of:
  an electro-mechanical hard disk drive; and
  a solid-state/flash device.

15. The computing system of claim 11 wherein the upgrade procedure includes upgrading system software for the data storage system.

* * * * *